United States Patent
Lewis, Jr. et al.

(10) Patent No.: US 6,983,589 B2
(45) Date of Patent: Jan. 10, 2006

(54) DIESEL AFTERTREATMENT SYSTEMS

(75) Inventors: Woodrow Lewis, Jr., Ypsilanti, MI (US); Michiel J. van Nieuwstadt, Ann Arbor, MI (US)

(73) Assignee: Ford Global Technologies, LLC, Detroit, MI (US)

( * ) Notice: Subject to any disclaimer, the term of this patent is extended or adjusted under 35 U.S.C. 154(b) by 87 days.

(21) Appl. No.: 10/430,998

(22) Filed: May 7, 2003

(65) Prior Publication Data
US 2004/0221571 A1 Nov. 11, 2004

(51) Int. Cl.
*F01N 3/00* (2006.01)

(52) U.S. Cl. .............................. 60/277; 60/274; 60/286
(58) Field of Classification Search ................. 60/274, 60/277, 286, 295, 303
See application file for complete search history.

(56) References Cited

U.S. PATENT DOCUMENTS

| | | | |
|---|---|---|---|
| 5,133,184 A | * | 7/1992 | Geiger ........................ 60/274 |
| 5,255,511 A | * | 10/1993 | Maus et al. .................. 60/274 |
| 5,428,956 A | * | 7/1995 | Maus et al. .................. 60/277 |
| 5,630,315 A | * | 5/1997 | Theis ........................... 60/274 |
| 5,706,652 A | | 1/1998 | Sultan |
| 5,751,602 A | * | 5/1998 | Maus et al. .................. 60/274 |
| 5,752,382 A | | 5/1998 | Hanafusa et al. |
| 5,860,277 A | * | 1/1999 | Schnaibel et al. ............ 60/274 |
| 5,938,715 A | | 8/1999 | Zhang et al. |
| 6,363,713 B1 | | 4/2002 | Wu et al. |
| 6,408,616 B1 | | 6/2002 | Mazur et al. |
| 6,487,852 B1 | * | 12/2002 | Murphy et al. ................ 60/286 |

* cited by examiner

*Primary Examiner*—Thomas Denion
*Assistant Examiner*—Diem Tran
(74) *Attorney, Agent, or Firm*—Allan J. Lippa; Alleman Hall McCoy & Tuttle LLP

(57) ABSTRACT

A method for accurately diagnosing deterioration in an emission control system for a lean burn internal combustion engine is presented. The emission control system includes an Active Lean NOx (ALNC) Catalyst and a system for injecting a hydrocarbon-based reductant into the ALNC thereby improving its NOx conversion efficiency. The method teaches calculating a rate of change of exotherm across the ALNC and differentiating between deterioration of the ALNC and deterioration of the reductant injection system based on the magnitude and the sign of the rate of change of the exotherm. Once the diagnosis of deterioration is made, and the deteriorated component is identified, appropriate corrective measures, such as adjusting or discontinuing the reductant injection amount, and setting diagnostic codes, are taken.

26 Claims, 5 Drawing Sheets

DIESEL AFTERTREATMENT SYSTEMS

FIELD OF INVENTION

The present invention relates to a system and a method for diagnosing degradation in a lean exhaust gas aftertreatment system, and more particularly to differentiating between degradation of an Active Lean NOx (ALNC) catalyst and of a reductant injection system for the ALNC.

BACKGROUND AND SUMMARY OF THE INVENTION

Current emission control regulations necessitate the use of catalysts in the exhaust systems of automotive vehicles in order to convert carbon monoxide (CO), hydrocarbons (HC), and nitrogen oxides (NOx) produced during engine operation into unregulated exhaust gasses. Vehicles equipped with diesel or lean gasoline engines offer the benefits of increased fuel economy. Such vehicles are typically equipped with lean exhaust gas aftertreatment devices, such as, for example, Active Lean NOx (ALNC) Catalysts, which are capable of continuously reducing NOx emissions in an oxygen rich environment. In order to maximize NOx reduction in the ALNC, a hydrocarbon-based reductant, such as fuel, is introduced into the exhaust gas entering the device via a reductant injection system. Typically, the amount of reductant injection is based on operating conditions, such as engine speed, load, ALNC temperature, etc. It is desirable to precisely control reductant injection amounts since under-injection of reductant may cause reduced NOx conversion efficiency of the ALNC, while overinjection results in unnecessary fuel economy penalty.

The inventors herein have recognized that degradation of the reductant injection system (such as leaking or clogging injectors, for example) and degradation of the ALNC due to, for example, aging or thermal damage, may cause over- or under-injection of reductant.

In that regard, the inventors have recognized that once the ALNC has reached certain operating temperatures, injection of reductant will create a temperature rise, or exotherm, across the ALNC due to hydrocarbon combustion in the device. The inventors have further recognized that it is possible to both diagnose degradation in the emission control system-and to identify the component responsible for the degradation by monitoring the rates of change of the exotherm across the ALNC.

Accordingly, the present invention is directed to a method for diagnosing degradation an emission control system for a lean burn internal combustion engine, the system including an Active Lean NOx Catalyst (ALNC) and a reductant injection system coupled upstream of the ALNC, the method including: calculating a rate of change of an exotherm across the ALNC; and differentiating between the ALNC and the reductant injection system as a cause of the emission control system degradation based on said calculated rate of change of said exotherm.

In one embodiment of the present invention, the method includes providing an indication that the reductant injection system is leaking if the rate of change of the exotherm is greater than a first positive value. In another embodiment of the present invention, the method includes adjusting the amount of reductant injection into the device to compensate for the leaking. In yet another embodiment of the present invention, the method includes adjusting the injected reductant amount to compensate for reduced efficiency if the rate of change of the exotherm is less than a first negative value and greater than a second negative value. In another embodiment of the present invention, the method includes disabling the reductant supply to the reductant injection system if the rate of change of the exotherm is less than a second negative value.

The present invention provides a number of advantages. In particular, monitoring the rate of change of the exotherm provides an accurate indication of system degradation that is not susceptible to transient exotherm changes due to instantaneous variations in the amounts of injected reductant. Yet another advantage of the present invention is the ability to identify the component responsible for the emission system degradation and to take appropriate corrective measures. Further, accurate and fast detection of the emission system degradation improves fuel economy and emission control in the vehicle.

The above advantages and other advantages, objects and features of the present invention will be readily apparent from the following detailed description of the preferred embodiments when taken in connection with the accompanying drawings.

BRIEF DESCRIPTION OF THE DRAWINGS

The objects and advantages described herein will be more fully understood by reading an example of an embodiment in which the invention is used to advantage, referred to herein as the Description of Preferred Embodiment, with reference to the drawings, wherein.

DESCRIPTION OF PREFERRED EMBODIMENT(S)

Figure 1A:
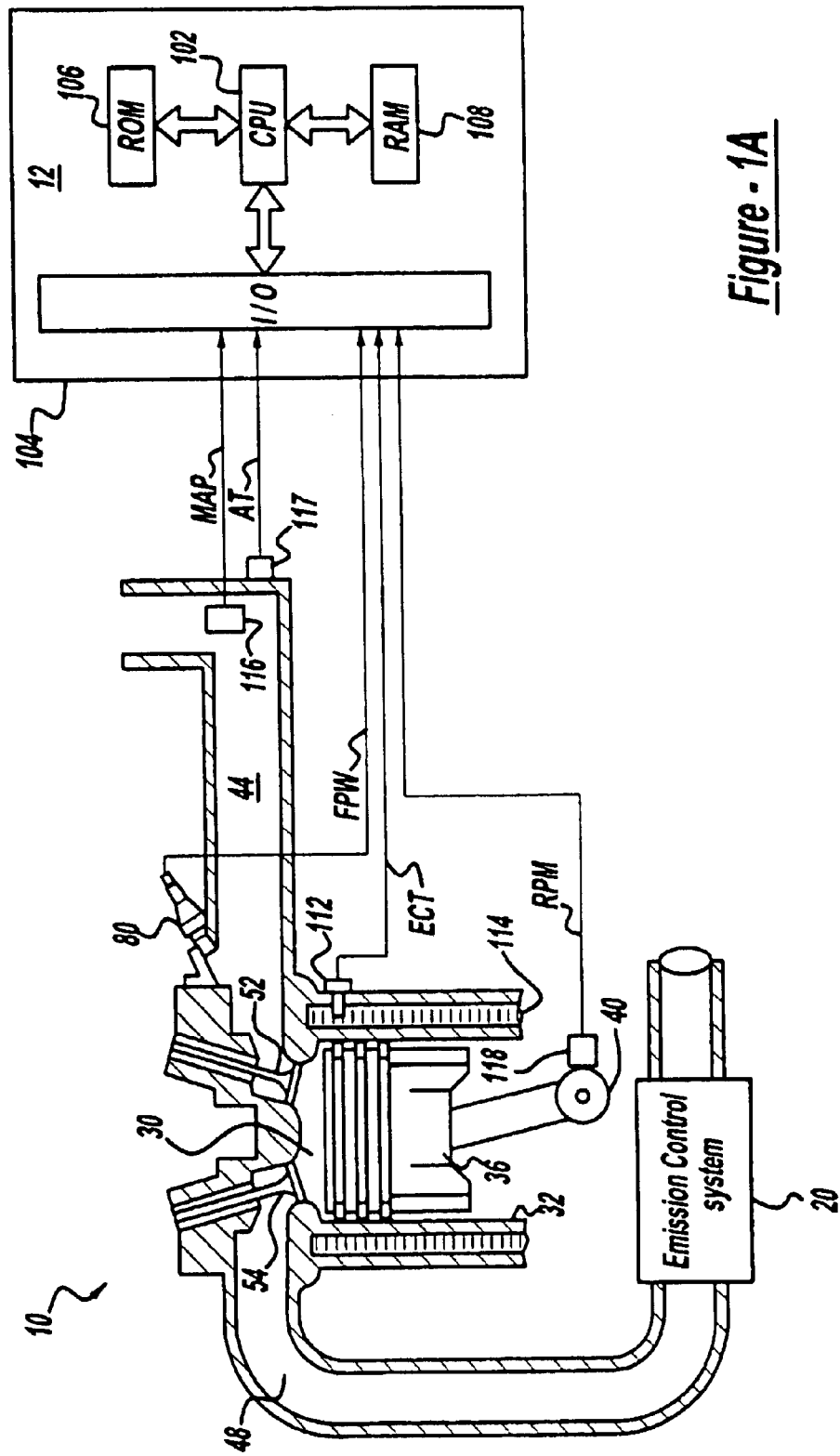
FIGS. 1A and 1B are schematic diagrams of an engine wherein the invention is used to advantage.

Internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Intake manifold 44 is also shown having fuel injector 80 coupled thereto for delivering liquid fuel in proportion to the pulse width of signal FPW from controller 12. Both fuel quantity, controlled by signal FPW and injection timing are adjustable. Fuel is delivered to fuel injector 80 by a fuel system (not shown) including a fuel tank, fuel pump, and fuel rail (not shown).

Controller 12 is shown in FIG. 1 as a conventional microcomputer including: microprocessor unit 102, input/output ports 104, read-only memory 106, random access memory 108, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a measurement of manifold pressure (MAP) from pressure sensor 116 coupled to intake manifold 44; a measurement (AT) of manifold temperature from temperature sensor 117; an engine speed signal (RPM) from engine speed sensor 118 coupled to crankshaft 40.

An emission control system 20 is coupled to an exhaust manifold 48 and is described in more detail in FIG. 2 below.

Figure 1B:
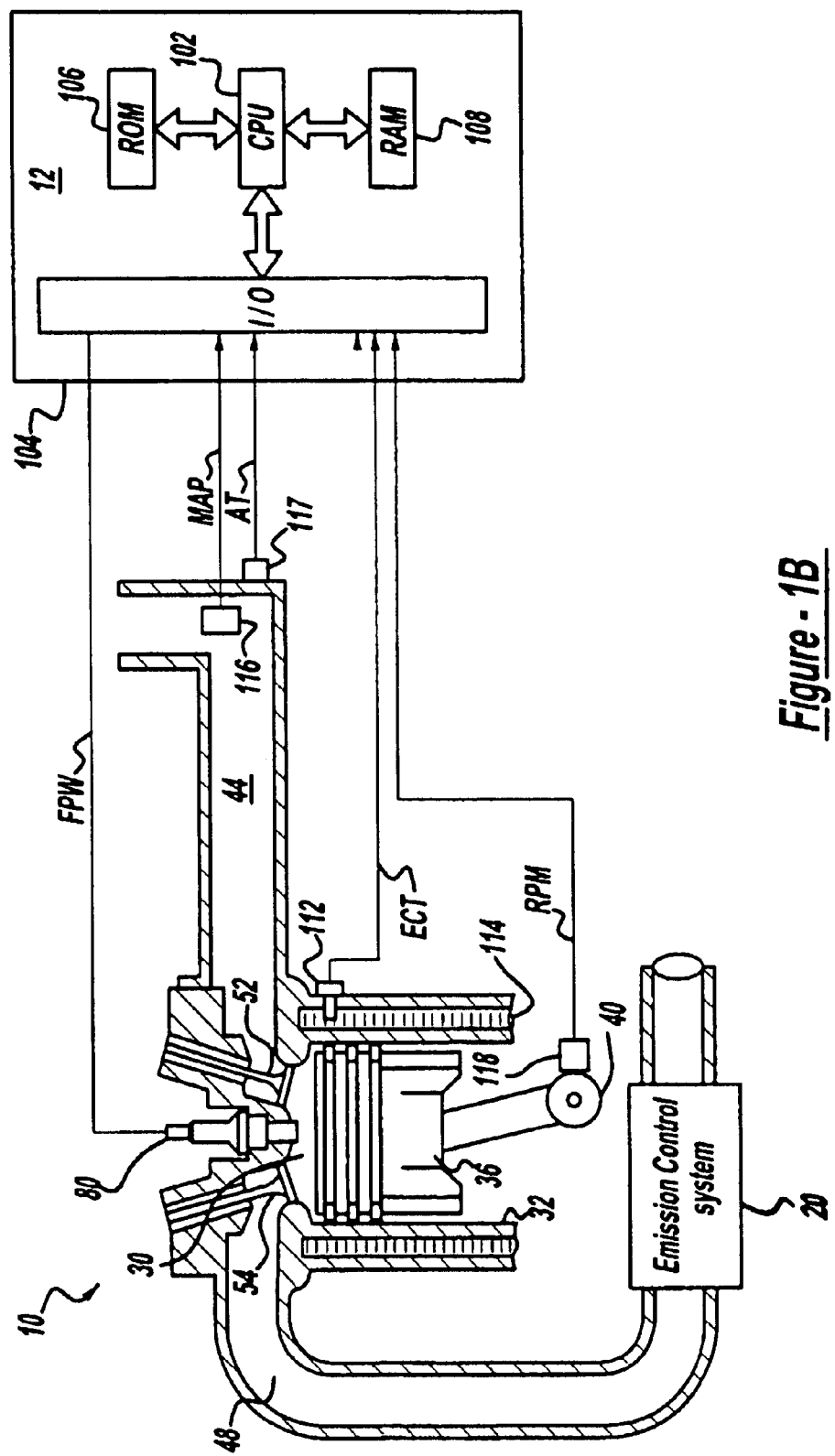

Referring now to FIG. 1B, an alternative embodiment is shown where engine 10 is a direct injection engine with injector 80 located to inject fuel directly into cylinder 30.

Figure 2:
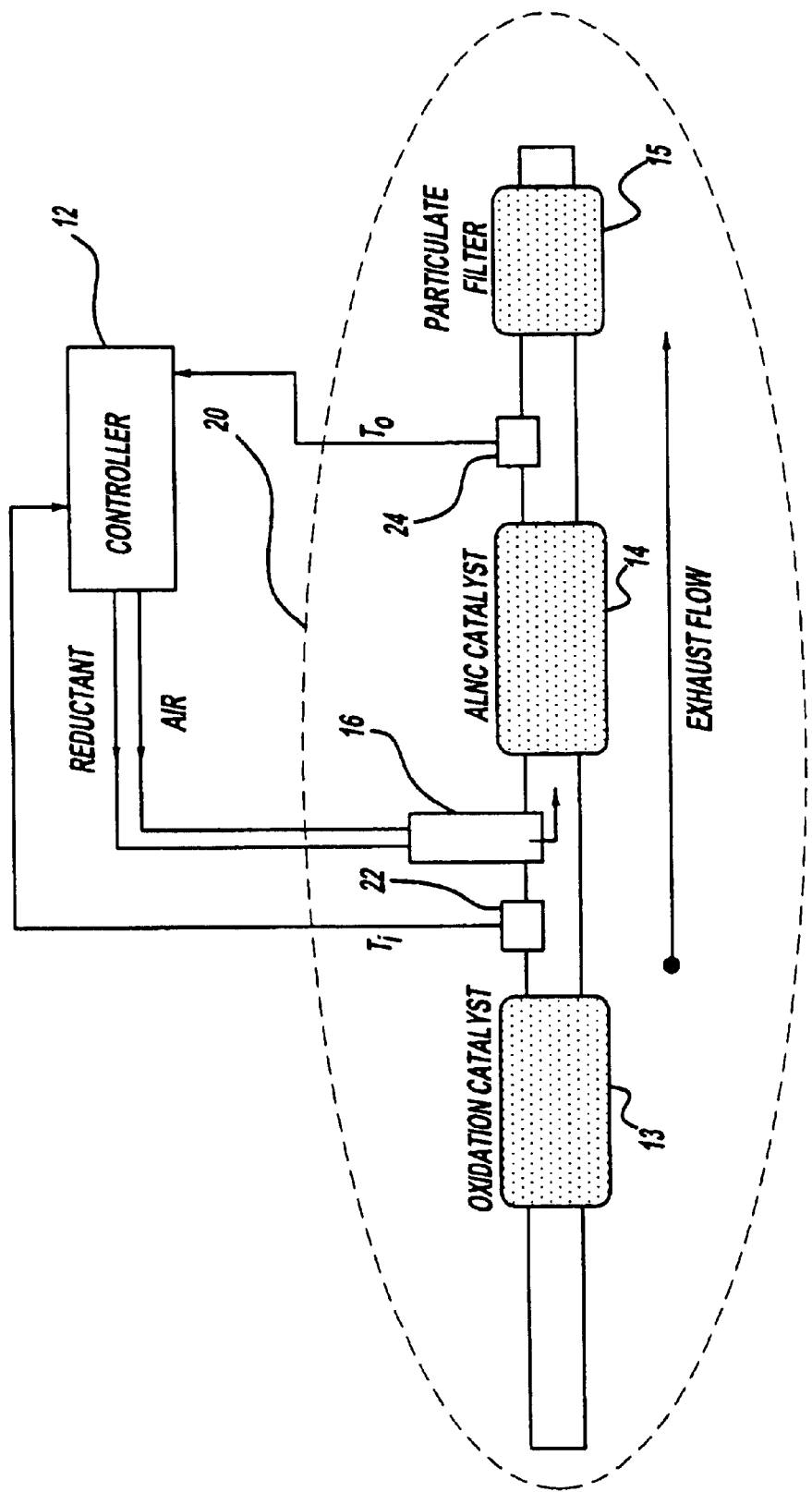
FIG. 2 is a schematic diagram of an example of an emission control system in accordance with the present invention.

Referring now to FIG. 2, an example of an emission control system in accordance with the present invention is described. Emission control system 20 is coupled downstream of an internal combustion engine (not shown) described with particular reference in FIGS. 1A and 1B. Catalyst 14 is an Active Lean NOx Catalyst (ALNC) capable of reducing NOx in an oxygen rich environment. Oxidation catalyst 13 is coupled upstream of the ALNC and may be a precious metal catalyst, preferably one containing platinum. The oxidation catalyst exothermically combusts hydrocarbons (HC) in the incoming exhaust gas from the engine thus supplying heat to rapidly warm up the Active Lean NOx Catalyst (ALNC) 14. Additionally, carbon monoxide (CO) produced as a result of HC combustion in the oxidation catalyst 13 improves NOx reduction in the ALNC. A reductant injection system 16 is coupled to the exhaust gas manifold between the oxidation catalyst and the ALNC. The reductant injection system delivers reductant, such as fuel (HC), from the fuel tank or from a storage vessel to the ALNC to improve its NOx conversion efficiency. System 16 may be any system known to those skilled in the art capable of delivering reductant to the NOx-reducing catalyst. In a preferred embodiment, reductant delivery system injects fuel (hydrocarbon) into the exhaust gas mixture entering catalyst 14. Exhaust gas temperature measurements upstream and downstream of the ALNC are provided to the controller 12 by the temperature sensors 22 and 24 respectively. Controller 12 calculates the rate of change of the exotherm across the ALNC as a function of the exhaust gas temperatures upstream and downstream of the ALNC (described in more detail in FIG. 4 below).

Controller 12 produces a control signal to control the amount of reductant to be supplied to the reductant injection system 16. The control signal is based on a nominal portion which is a function of a plurality of operating parameters (for example, engine speed, engine load, EGR level, start of fuel injection (SOI), ALNC temperature and space velocity (SV)) and on an adjustment portion, which is a function of the rate of change of the exotherm across the ALNC.

Particulate filter 15 is coupled downstream of the ALNC and is capable of storing carbon particles from the exhaust.

As will be appreciated by one of ordinary skill in the art, the routine described in FIGS. 3A and 3B below may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features and advantages of the invention, but is provided for ease of illustration and description. Although not explicitly illustrated, one of ordinary skill in the art will recognize that one or more of the illustrated steps or functions may be repeatedly performed depending on the particular strategy being used.

Figure 3A:
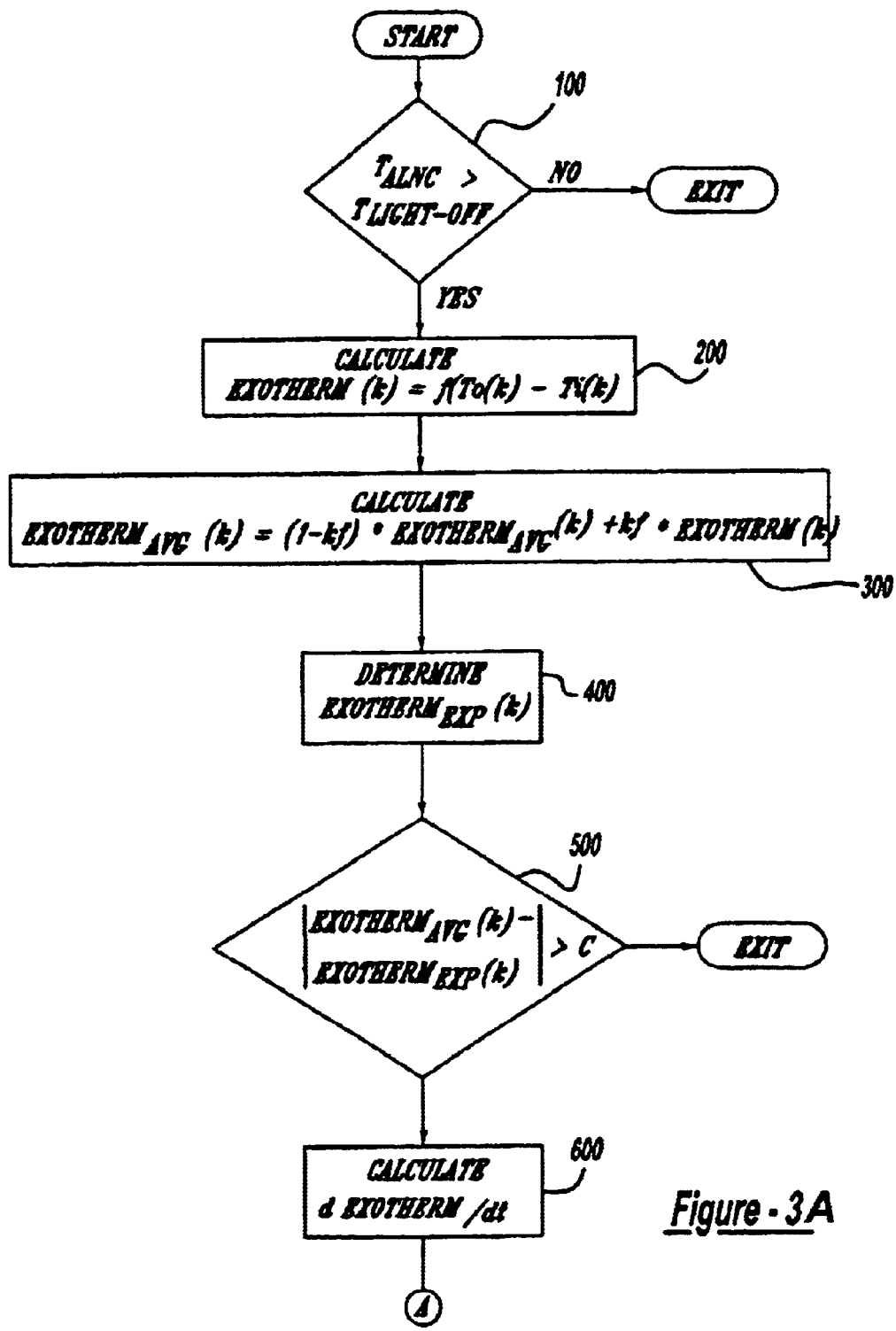
FIGS. 3A and 3B are high level flowcharts of an exemplary routine detecting degradation in an emission control system in accordance with the present invention.
Figure 3B:
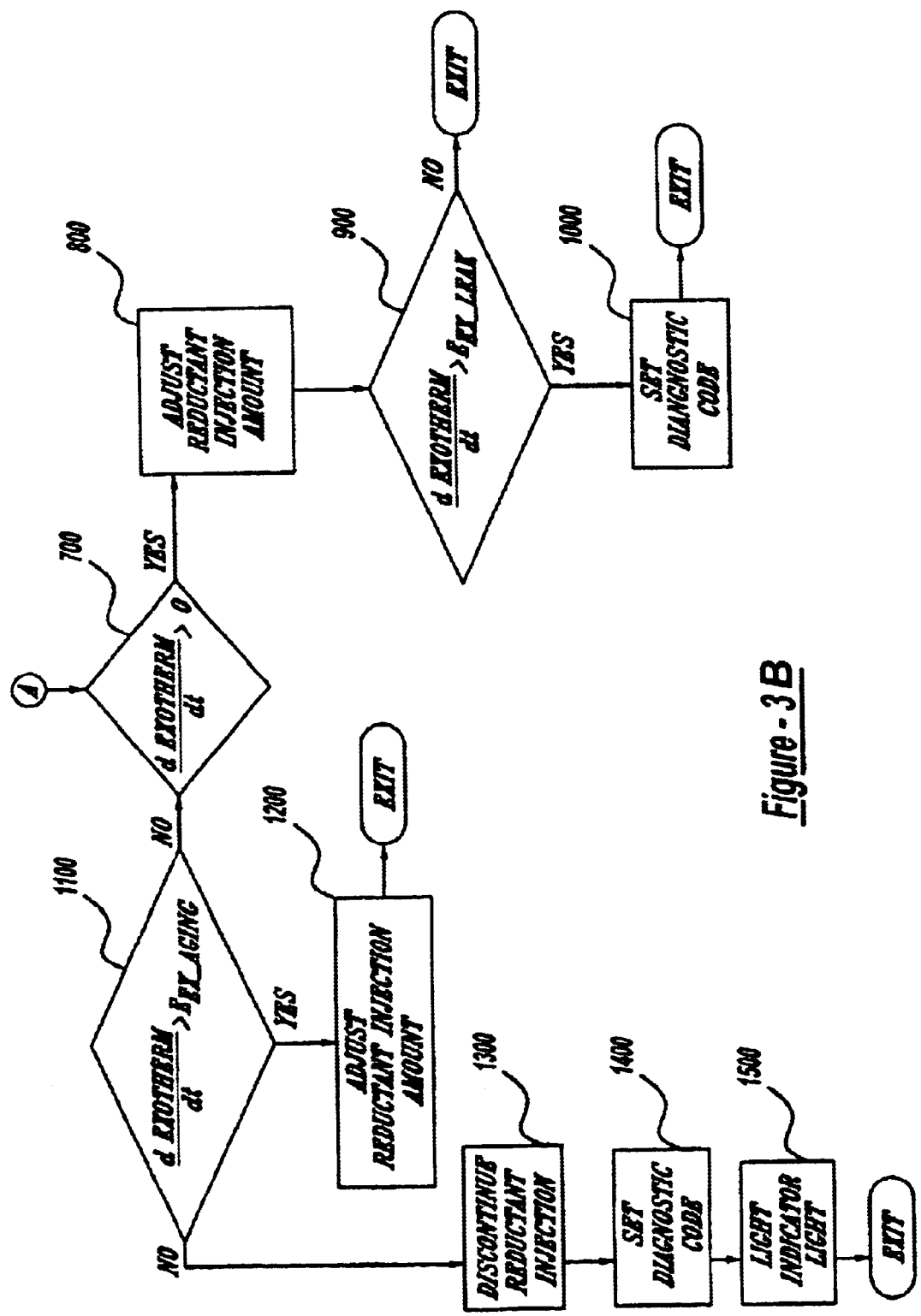

Referring now to FIGS. 3A and 3B, an exemplary routine for monitoring the rate of change of the exotherm across the ALNC is described. First, in step 100 a determination is made whether the ALNC temperature, $T_{ALNC}$, is greater than or equal to $T_{light-off}$. $T_{light-off}$, also known as the light-off temperature, is a temperature at which exothermic reaction between hydrocarbon and oxygen occurs in the ALNC. Any means known to those skilled in the art can be used to determine ALNC temperature, such as, for example, estimating temperature based on engine speed, load, manifold airflow, exhaust gas temperature upstream and downstream of the ALNC, etc. Alternatively, ALNC temperature can be determined from a temperature sensor placed mid-bed in the catalyst. If the answer to step 100 is NO, the routine exits. If the answer to step 100 is YES, i.e. the ALNC temperature at or above light-off, the routine proceeds to step 200 where the instantaneous exotherm or the amount of heat generated in the catalyst as a result of the reaction between the injected hydrocarbons and oxygen, is calculated as a function of the exhaust gas temperatures upstream and downstream of the ALNC:

$$\text{Exotherm}(k) = f(T_o(k) - T_i(k))$$

Next, in step 300, an average filtered value of the instantaneous exotherm is calculated:

$$\text{Exotherm}_{avg}(k) = (1 - KF) \cdot \text{Exotherm}_{avg}(k) + KF \cdot \text{Exotherm}(k)$$

where KF is a filter constant. The routine then proceeds to step 400 wherein an expected exotherm value for given operating conditions, such as engine speed and load, $\text{Exotherm}_{exp}(k)$, is determined from a prestored table. Next, in step 500, a determination is made whether the magnitude of the difference between the expected exotherm and the average filtered exotherm calculated in step 300 is greater than a predetermined limit value C. If the answer to step 500 is NO, i.e. there is no significant variation between actual and expected exotherm values, the routine exits. If the answer to step 500 is YES, indicating that there is a significant divergence between the actual and expected exotherm, the routine proceeds to step 600 wherein the rate of change of the exotherm is calculated according to the following equation:

$$\frac{d\, Exotherm}{dt} = \frac{Exotherm(k) - Exotherm(k-1)}{Time(k) - Time(k-1)}$$

The routine then proceeds to step 700 wherein a determination is made whether the rate of change of the exotherm is greater than zero, i.e. positive. A positive rate of change of the exotherm is due to an over-injection of hydrocarbons, which typically happens in a leaking reductant injection system.

If the answer to step 700 is YES, indicating that the reductant injection system is leaking, the routine proceeds to step 800 wherein the controller 12 adjusts the control signal to the reductant injection system to reduce the reductant supply to the ALNC to compensate for the leak. The routine then proceeds to step 900 wherein a determination is made whether the rate of change of the exotherm is greater than a predetermined positive value, Ex_leak. The magnitude of the rate of change of the exotherm is determinative of the corrective action to be taken. If the answer to step 800 is NO, indicating a small leak in the reductant injection system, the routine exits. If the answer to step 800 is YES, indicating a more serious degradation of the reductant injection system, such as a stuck open injector, the routine proceeds to step 1000, wherein a diagnostic code is set. The routine then exits.

If the answer to step 700 is NO, i.e. the rate of change of the exotherm is negative, the routine proceeds to step 1100 wherein a determination is made whether the rate of change is greater than a predetermined negative value, $E_{ex-aging}$. A negative rate of change of the exotherm indicates an under-injection of hydrocarbon, which could be caused by reduced ALNC efficiency due to normal aging, or by a restriction in a reductant injection system. If the answer to step 1100 is YES, which is indicative of a normal ALNC aging process, the routine proceeds to step 1200 wherein the controller 12 adjusts the control signal to the reductant injection system to increase the reductant supply to the ALNC to compensate for catalyst aging. The routine then exits. If the answer to step 1100 is NO, indicating a more serious degradation of the emission control system, such as ALNC thermal damage, or clogged-up reductant injection system, the routine proceeds to step 1300 wherein reductant injection into the ALNC is discontinued. The routine then proceeds to step 1400 wherein a diagnostic code is set, followed by step 1500 wherein an indicator light is turned on to alert vehicle operator. The routine then exits.

Therefore, according to the present invention, it is possible to diagnose degradation in a lean emission control system comprising an ALNC and an upstream reduction injection system by monitoring the magnitude and the sign of rate of change of exotherm across the ALNC. If the rate of change of the exotherm is positive but below a predetermined value, a small leak in the reductant injection system is diagnosed, and the amount of reductant injection into the ALNC is reduced to account for the small leak. If the rate of change of the exotherm is above the positive predetermined value, a stuck-open reductant injection system is diagnosed. In response to this diagnosis, a diagnostic code is set and an indicator light is turned on in addition to reducing the amount of reductant injected into the ALNC. On the other hand, a small negative rate of change of the exotherm is indicative of a normal ALNC aging process and the amount of reductant injected into the ALNC is increased accordingly to compensate for the aging. A rate of change of the exotherm that is less than a predetermined negative value is indicative of either ALNC damage or a more serious degradation of a reductant injection system, such as a clogged-up injection system. Under those circumstanced, reductant injection into the ALNC is discontinued, a diagnostic code is set and an indicator light is turned on to alert the operator of the vehicle.

This concludes the description of the invention. The reading of it by those skilled in the art would bring to mind many alterations and modifications without departing from the spirit and the scope of the invention. Accordingly, it is intended that the scope of the invention is defined by the following claims:

What is claimed is:

1. A method for diagnosing degradation an emission control system for a lean burn internal combustion engine, the system including an Active Lean NOx Catalyst (ALNC) and a reductant injection system coupled upstream of the ALNC, the method comprising:
    calculating a rate of change of an exotherm across the ALNC; and
    differentiating between the ALNC and the reductant injection system as a cause of the emission control system degradation, where the reductant injection system is identified as said cause when said calculated rate of change of said exotherm is in a first region, and the ALNC is identified as said cause when said calculated rate of change of said exotherm is in a second region less than said first region.

2. The method as set forth in claim 1 wherein said rate of change of said exotherm is determined by differentiating over time a difference between a temperature of an exhaust gas mixture exiting the ALNC and a temperature of an exhaust gas mixture entering the ALNC.

3. The method as set forth in claim 2 wherein said expected rate of change of exotherm is based on engine operating conditions.

4. The method as set forth in claim 3 wherein said engine operating conditions comprise engine speed.

5. The method as set forth in claim 4 wherein said operating conditions further comprise engine load.

6. The method as set forth in claim 5 wherein said operating conditions further comprise catalyst age.

7. The method as set forth in claim 6 wherein said operating conditions further comprise an ALNC temperature.

8. A method for diagnosing degradation an emission control system for a lean burn internal combustion engine, the system including an Active Lean NOx Catalyst (ALNC) and a reductant injection system coupled upstream of the ALNC, the method comprising:
    calculating a rate of change of an exotherm across the ALNC;
    differentiating between the ALNC and the reductant injection system as a cause of the emission control system degradation based on said calculated rate of change of exotherm; and
    providing an indication that the reductant injection system is leaking when said calculated rate of change of exotherm is greater than zero.

9. The method as set forth in claim 8 further comprising adjusting an amount of reductant supply to the reductant injection system in response to said indication to compensate for said leaking.

10. The method as set forth in claim 9 further comprising providing an indication that the reductant injection system is stuck open when said calculated rate of change of exotherm is greater than a predetermined positive value.

11. The method as set forth in claim 10 further comprising turning off reductant supply to the reductant injection system in response to said indication.

12. The method as set forth in claim 11 further comprising setting a diagnostic code.

13. The method as set forth in claim 12 further comprising lighting up an indicator light.

14. A method for diagnosing degradation an emission control system for a lean burn internal combustion engine, the system including an Active Lean NOx Catalyst (ALNC) and a reductant injection system coupled upstream of the ALNC, the method comprising:
    calculating a rate of change of an exotherm across the ALNC;
    differentiating between the ALNC and the reductant injection system as a cause of the emission control system degradation based on said calculated rate of change of exotherm; and
    increasing an amount of reductant injection into the ALNC if said calculated rate of change of exotherm is less than zero and greater than a predetermined negative value.

15. The method as set forth in claim 14 further comprising setting a diagnostic code if said calculated rate of change of exotherm is less than said predetermined negative value.

16. The method as set forth in claim 15 further comprising lighting an indicator light.

17. The method as set forth in claim 16 further comprising turning off reductant supply to the reductant injection system.

18. A method for diagnosing degradation in a reductant injection system adapted to inject a reductant into an exhaust gas aftertreatment device, the method comprising:

generating an exotherm across the device by injecting the reductant into the device;

calculating a rate of change over an interval of said exotherm; and providing an indication that the reductant injection system is degraded based on said calculated rate of change of said exotherm.

19. The method as set forth in claim 18 wherein the exhaust gas aftertreatment device is an ALNC.

20. The method as set forth in claim 19 wherein the reductant is hydrocarbon.

21. The method as set forth in claim 20 further comprising adjusting an amount of the reductant injected into device in response to said indication of degradation.

22. The method as set forth in claim 18 further comprising discontinuing reductant injection into the device if said calculated rate of change of said exotherm is less than a predetermined negative value.

23. The method as set forth in claim 18 further comprising providing a second indication that the an exhaust gas aftertreatment device is degraded based on said calculated rate of change of said exotherm.

24. A system for monitoring a performance of an internal combustion engine, comprising:

an exhaust gas aftertreatment device;

an injector adapted to inject a reductant into said device; and a controller for injecting said reductant into said device via said injector thereby creating an exotherm across said device, said controller further calculating a rate of change of said exotherm, and indicating that said injector is degraded when said calculated rate of change of said exotherm is in a first region, and indicating that said exhaust gas aftertreatment device is degraded when said calculated rate of change of said exotherm is in a second region less than said first region.

25. An article of manufacture comprising:

a computer storage medium having a computer program encoded therein for use with an emission control system for an internal combustion engine, said emission control system including an exhaust gas aftertreatment device and a reductant injection system injecting a reductant into said exhaust gas aftertreatment device, said computer program comprising:

code for providing an indication of an operating condition;

code for calculating a rate of change of an exotherm over time across said device in response to said indication; and code for adjusting an amount of said reductant injected into said device based on said calculated rate of change of said exotherm.

26. A method for controlling an emission control system for an internal combustion engine, the system including an exhaust gas aftertreatment device and a reductant injection system coupled upstream of the device, the method comprising:

providing an indication of an operating condition; and in response to said indication adjusting an amount of reductant injected into the device based on a rate of change over time of an exotherm generated across the device as a result of a reductant injection to compensate for degradation of one of the reductant delivery system and the exhaust gas aftertreatment device.

* * * * *